United States Patent [19]

Dunn et al.

[11] 3,768,327

[45] Oct. 30, 1973

[54] COMPOSITE HEAVY-DUTY MECHANISM ELEMENT

[75] Inventors: William M. Dunn, Farmington; Myron C. Sarnes, Northville, both of Mich.

[73] Assignee: Federal-Mogul Corporation, Southfield, Mich.

[22] Filed: Mar. 20, 1972

[21] Appl. No.: 235,939

Related U.S. Application Data

[62] Division of Ser. No. 95, 299, Dec. 4, 1970, Pat. No. 3,665,585.

[52] U.S. Cl. .................................................. 74/434
[51] Int. Cl. ............................................ F16h 55/04
[58] Field of Search ..................... 74/434, 417, 423; 29/159.2, 182, 182.3

[56] References Cited
UNITED STATES PATENTS

| | | | |
|---|---|---|---|
| 3,666,456 | 5/1972 | Haller | 29/182.3 X |
| 2,331,909 | 10/1943 | Hensel et al. | 29/159.2 |
| 2,561,579 | 7/1951 | Lenel | 74/434 |
| 2,704,465 | 3/1955 | Haller | 74/434 |
| 3,678,557 | 7/1972 | Howard | 29/159.2 |

*Primary Examiner*—Leonard H. Gerin
*Attorney*—Willis Bugbee

[57] ABSTRACT

A composite mechanism element, such as a composite bevel element (FIGS. 1 to 6 inclusive), has its working or load-bearing portion or portions composed of sintered powdered high-performance alloy while its supporting portion not subjected to concentrated or heavy loads, is made of an inexpensive base metal, such as sintered powdered iron. The outer load-bearing portion of the composite bevel element and the hollow frusto-conical inner supporting portion (FIGS. 5 and 6) are separately briquetted from high performance alloy powder and low performance metal powder respectively and separately sintered after which the low performance inner supporting portion is pressed in the high performance toothed outer portion so as to be inseparably secured thereto. The low-performance and high-performance portions separately sintered and thereafter are pressed together in an assembling operation which causes the high performance and low performance portions of each race to be inseparably secured to one another. The resulting composite sintered powdered mechanism elements are of much lower material cost than corresponding mechanism elements formed of high performance alloy throughout yet perform satisfactorily and have sufficient strength and durability for most purposes. These heavy-duty mechanism elements may be used as they are if of satisfactory density for their intended uses, or they may be further densified by being subjected to an additional hot forging operation which rams the portions together under high heat and pressure in the forging die of a forging press and thereby not only substantially solidifies the hitherto porous structure but also causes metallic interflow across the junction or boundary between the two portions so as to still more tenaciously join them together.

2 Claims, 6 Drawing Figures

PATENTED OCT 30 1973 3,768,327

COMPOSITE HEAVY-DUTY MECHANISM ELEMENT

This is a division of our co-pending application, Ser. No. 95,299, filed Dec. 4, 1970, for Composite Heavy-Duty Mechanism Element and Method of Making the Same now U.S. Pat. No. 3,665,585 issued May 30, 1972.

BACKGROUND AND SUMMARY OF THE INVENTION

Heavy-duty mechanism elements which during operation are subjected to heavy loads or stresses have hitherto been formed throughout from high-cost nickel-content alloys which in themselves are very expensive and which consequently cause such mechanism elements made therefrom to be likewise very expensive. In actual fact, however, only a portion of such mechanism elements is ordinarily subjected to concentrated heavy loads, torques or stresses which require the use of high performance alloys, yet the formation of the entire mechanism element therefrom has hitherto been required and has been of excessively high cost of production not only from the high cost of the alloys themselves but also from the expensive forging operations required in its production.

The present invention overcomes these prior disadvantages by providing heavy-duty mechanism elements, such as bevel pinions and the inner races of tapered roller bearings wherein the working portions subjected to heavy or concentrated loads, torques or other stresses are formed from sintered powdered high-performance alloys whereas the remaining supporting portions thereof are formed from separately briquetted sintered powdered low-performance metals. The two portions, thus separately produced, are then pressed tightly into inseparable engagement with one another and optionally hot-forged together. As a result, the amount of high-cost high-performance alloy in each such mechanism element is greatly reduced in comparison to the forging of the same mechanism element from solid high-performance alloys throughout with a corresponding reduction in the ultimate cost of the finished mechanism element as well as a conservation of the nickel and other expensive metals which go into such alloys as components thereof. At the same time, however, the heavy-duty load-bearing performance capability of the composite mechanism element is preserved without entailing the high cost previously accompanying the production of forged unitary high performance mechanism elements of high performance alloys throughout.

Figure 5:
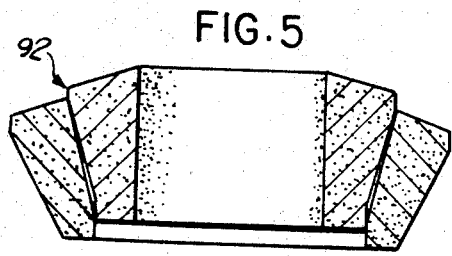
Figure 6:
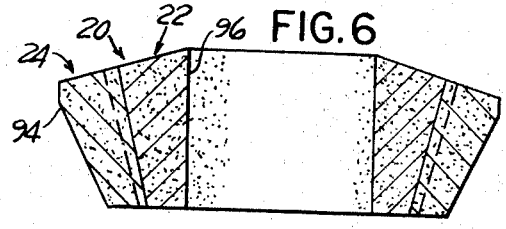

FIG. 5 is a central vertical section through the inner and outer components for the bevel pinion shown in FIG. 6, at the commencement of the assembling operation for uniting said outer and inner components; and FIG. 6 is a central vertical section through the composite heavy-duty bevel pinion formed in the manner shown in FIGS. 10 to 14 inclusive, with the dotted lines indicating the roots of the teeth thereon.

Referring to the drawings in detail, FIGS. 1 to 6 inclusive show the adaptation of the present invention to the production of a composite heavy-duty mechanism element, such as the bevel pinion, generally designated 20 (FIG. 6) consisting of an inner component 22 of low-performance sintered powdered metal, such as sintered powdered iron, and a toothed outer component 24 of high-performance sintered powdered metal alloy united thereto by pressure forging, as shown in FIG. 5. The outer or toothed component 24 is formed by compressing a charge 26 (FIGS. 1 and 2) of a high-performance powdered metal alloy in the generally frusto-conical die cavity 28 of a briquetting die 30 having cylindrical upper and lower bores 32 and 34 respectively joined by a frusto-conical bore 36.

Such a high-performance alloy may consist, for example, of the so-called "S.A.E. 4600" modified alloy, the composition of which is ordinarily as follows:

| | | |
|---|---|---|
| 0 to 0.25% | Mn. | |
| 1.75 to 2.00% | Ni. | the remainder being Fe. |
| 0.35 to 0.60% | Mo. | |

The standard "S.A.E. 4600" alloy of which the above is a modification has the following composition:

| | | |
|---|---|---|
| 0.45 to 0.65% | Mn. | |
| 1.65 to 2.00% | Ni. | |
| | | the remainder being Fe. |
| 0.20 to 0.30% | Mo. | |
| 0.20 to 0.35% | Si. | |

The silicon component is omitted in the modified alloy because silicon is detrimental to the working life of a die set. It is ordinarily inserted in the above standard alloy in order to increase the fluidity of the molten alloy during the casting of intricate shapes.

The die 30 is mounted in a conventional briquetting press 38 having an upper outer tubular punch 40, a lower tubular punch 42, and an upper inner solid punch 44. The latter has upper and lower cylindrical portions 46 and 48 respectively interconnected by a frusto-conical portion 50 and reciprocable in upper and lower inner bores 52 and 54 within the tubular punches 40 and 42. The smaller diameter cylindrical portion 48 serves as a nose portion when the inner upper punch 44 is raised together with the outer punch 40 so as to permit filling of the die cavity 28 and at the same time prevent the powdered metal alloy in the charge 28 from dropping into the otherwise open bore 54 within the lower tubular punch 42.

Prior to filling the die cavity 26 (FIG. 1) the outer upper tubular punch 40 is retracted upward so as to uncover the top of the die cavity 26. The latter is then filled with the charge 28 of high-performance powdered metal alloy. The outer and inner upper punches 40 and 44 are then moved downward in their respective bores 32 and 52, 54 from the position of FIG. 1 to that of FIG. 2 while the lower tubular punch 42 is moved upward in its respective bore 34 so as to compress the powdered metal alloy charge 28 between the respective opposing annular end surfaces 56 and 58 (FIG. 2) into a briquette 60, of the same dimensions and proportions as the die cavity 26 and charge 28 at the end of the stroke of the punches 40, 42 and 44 as shown in FIG. 2. The briquette 60 is then placed in a conventional sintering oven and sintered in a protective atmosphere such as hydrogen at conventional sintering times and temperatures well-known to those skilled in the powder metallurgy art. The workpiece, upon removal from the sintering oven after sintering, becomes the outer or toothed heavy-duty component 22 of the bevel pinion 20 shown in FIG. 6.

Figure 1:
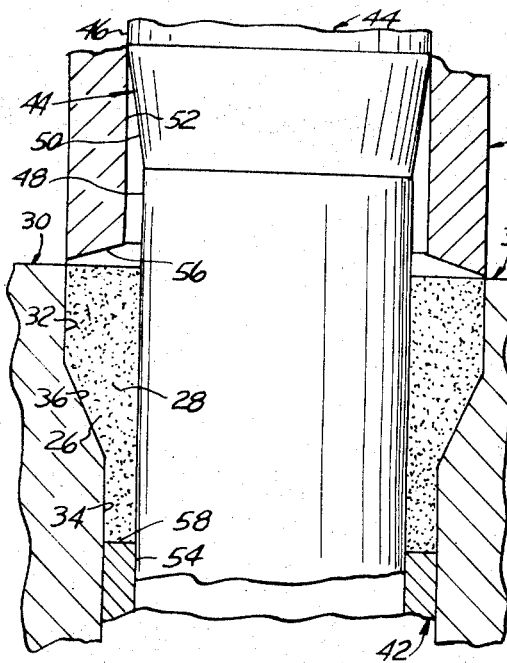
FIG. 1 is a central vertical section through the die cavity of a briquetting press showing the positions of the various parts at the commencement of briquetting the outer heavy-duty mechanism element, such as the or working component of the heavy-duty bevel pinion shown in FIG. 6.
Figure 2:
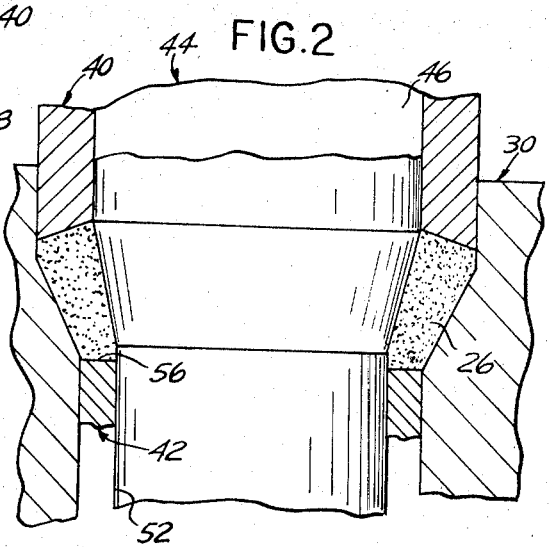
FIG. 2 is a view similar to FIG. 1 but showing the positions of the various parts at the termination of the briquetting operation.
Figure 3:
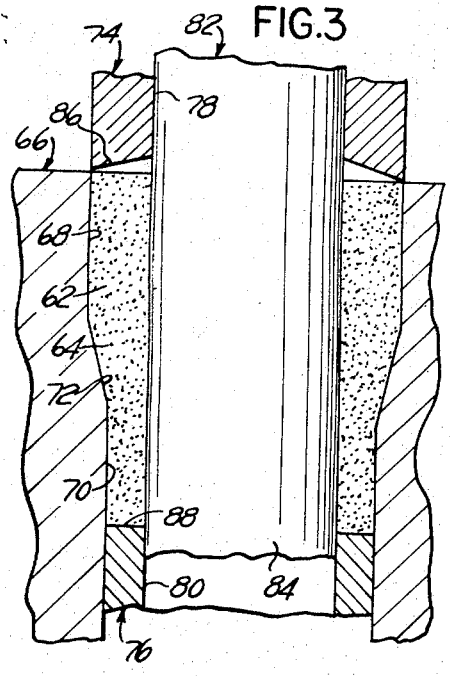
FIG. 3 is a central vertical section through the die cavity of a briquetting press showing the positions of the parts at the commencement of the briquetting operation of the inner or supporting or hub component of the bevel pinion shown in FIG. 6.

The inner component 22 of the bevel pinion 20 is similarly formed (FIGS. 5 and 6) by placing a charge 62 of inexpensive low-performance powdered base metal, such as powdered iron, in the generally frusto-conical die cavity 64 in a briquetting die 66 which is generally similar to the briquetting die 30 of FIGS. 1 and 2 in that it has cylindrical upper and lower bores 68 and 70 respectively joined by a frusto-conical bore 72. Reciprocably mounted in the upper and lower cylindrical bores 68 and 70 are upper and lower tubular punches 74 and 76. Mounted within the bores 78 and 80 in the upper and lower tubular punches 74 and 76 is a cylindrical core rod 82, the outer cylindrical surface 84 of which, along with the upper and lower cylindrical bores 68 and 70 and the frusto-conical bore 72 constitute the die cavity 64.

Figure 4:
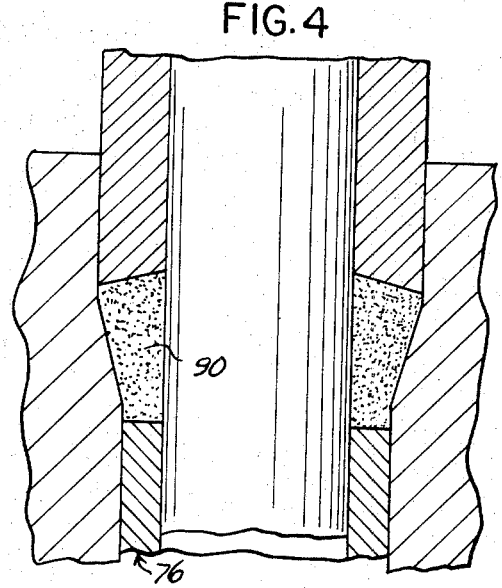
FIG. 4 is a view similar to FIG. 3 but showing the positions of the parts at the termination of the briquetting operation.

In making the inner component 22, the upper punch 74 is retracted upward so as to uncover the die cavity 64. The latter is then filled with the charge 62 of low-performance powdered metal, such as powdered iron, whereupon the upper punch 74 is moved downward and the lower punch 86 is moved upward so as to compress the powdered metal charge 62 between their respective opposing annular end surfaces 86 and 88 respectively into a briquette 90 (FIG. 4). The tubular upper punch 74 and lower punch 76 are then moved upward to eject the briquette or compact 90 from the die cavity 64. The briquette or compact 90 is then sintered in the same manner as described above for the outer component 24, thereby becoming the inner component 22. The inner component 22 of base metal is then forced into the interior of the sintered high-performance alloy outer component 24 in a forging operation (FIG. 5), producing the composite blank 92. The latter is then cut or ground with bevel teeth 94, whereupon the blank 92 becomes the finished bevel pinion 20 containing an inner bore 96 which is adapted to receive the shaft (not shown) upon which the bevel pinion 20 is to be mounted.

I claim:

1. A composite heavy-duty mechanism element comprising
   an annular supporting member of inexpensive low-performance sintered powdered metal particles having a substantially frusto-conical external surface thereon,
   and an annular working member of high-performance sintered powdered metal alloy particles having a corresponding substantially frusto-conical internal surface therein disposed in coaxial surface-to-surface mating engagement with said supporting member in press-fitted relationship therewith and having a substantially frusto-conical junction surface therebetween.

2. A composite heavy-duty mechanism element, according to claim 1, wherein said members are disposed in surface-to-surface hot-forged engagement with one another.

* * * * *